United States Patent [19]

Lefferts

[11] 4,346,138

[45] Aug. 24, 1982

[54] SIEVE BELT OF THERMOSETTABLE SYNTHETIC RESIN HELICES FOR PAPERMAKING MACHINE

[75] Inventor: Johannes Lefferts, Enschede, Netherlands

[73] Assignee: SITEG Siebtechnik GmbH, Ahaus-Alstatte, Fed. Rep. of Germany

[21] Appl. No.: 111,497

[22] Filed: Jan. 11, 1980

[30] Foreign Application Priority Data

Apr. 23, 1979 [NL] Netherlands ........................ 7903176
Sep. 21, 1979 [DE] Fed. Rep. of Germany ....... 2938221

[51] Int. Cl.³ .............................................. D04H 3/02
[52] U.S. Cl. .................................... 428/222; 162/348; 162/DIG. 1
[58] Field of Search .......................... 162/DIG. 1, 348; 139/383 A, 425 A; 428/32, 222, 371, 377

[56] References Cited

U.S. PATENT DOCUMENTS

| 750,903 | 2/1904 | Shrum et al. ................... 428/102 X |
| 2,867,112 | 1/1959 | Krone .................................... 52/676 |
| 3,096,956 | 7/1963 | Oestrich ............................ 404/36 X |
| 3,161,258 | 12/1964 | Chapman ......................... 160/264 X |
| 3,562,079 | 2/1971 | Steel ..................................... 428/222 |
| 3,562,082 | 2/1971 | Van Buskirk .................... 428/286 X |
| 3,717,530 | 2/1973 | Case et al. ......................... 428/76 X |
| 3,949,530 | 4/1976 | Williams et al. .................. 428/53 X |
| 4,071,647 | 1/1978 | McMullen ............................ 428/102 |

FOREIGN PATENT DOCUMENTS

| 708758 | 5/1965 | Canada ........................ 162/DIG. 1 |
| 2419751 | 12/1975 | Fed. Rep. of Germany ...... 162/348 |
| 1282861 | 12/1961 | France ........................... 162/DIG. 1 |
| 1018419 | 1/1966 | United Kingdom . |
| 1522801 | 8/1978 | United Kingdom . |

OTHER PUBLICATIONS

Pp. 135 to 142 of the Mar. 1962 Magazine "Fordern und Heben".

Primary Examiner—Henry F. Epstein
Attorney, Agent, or Firm—Sughrue, Mion, Zinn, Macpeak & Seas

[57] ABSTRACT

A sieve belt formed of a multiplicity of helices of thermosettable synthetic resin monofilament. Adjacent helices are meshed together so that overlapping windings form a channel through which a pintle-filament is passed. The helices are free of bias and torsion both before and after being assembled in the belt. After assembly the belt is stretched longitudinally and thermoset, causing the helix windings to penetrate slightly into the pintle-filament to tightly surround it with line contact, and to flatten the long legs of the oval windings between pintle-filaments.

5 Claims, 11 Drawing Figures

SHEARING

CLAMPING

SIEVE BELT OF THERMOSETTABLE SYNTHETIC RESIN HELICES FOR PAPERMAKING MACHINE

BACKGROUND OF THE INVENTION

The invention relates to a sieve belt composed of a multiplicity of helices of thermosettable synthetic resin monofilament in which adjacent helices are interlocked such that the windings of one helix enter between the windings of the adjacent helix, and having a pintle passed through the channel formed by adjacent helices.

In a sieve belt as taught in German Offenlegungsschrift No. 2,419,751 the helices, after their windings are interlocked, exhibit bias similar to a tension spring urging adjacent windings against each other. This bias is caused by the use of closely wound helices. In order to be interlocked, these helices must be stretched until the windings of one helix can enter between the windings of the adjacent helix. In operation, for example in a paper making machine, the sieve belt runs over rolls, causing the helices to "hinge" about the inserted pintle-filament. The contacting sides of the interlocking windings thus move relative to each other, resulting in friction and wear. This limits the service life of the known sieve belt. Furthermore, in the known sieve belt the diameter of the channel through which the pintle-filament is inserted must be greater than the diameter of the pintle-filament. For this reason the helices must be oval to begin with, and in cross section of the helices the inner clearance between the nearly parallel portions or legs of the ovals must be greater than the diameter of the inserted pintle-filament. As a consequence, grooves are formed in the surface of the finished sieve belt which extend parallel to the inserted pintle-filaments and leave marks in the paper. Moreover, there is a great deal of free space between the helices which results in non-uniform permeability. Furthermore, the helices in the known sieve belt possess a degree of torsion, i.e. in each winding the synthetic resin filament is turned once about its longitudinal axis. This torsion results in the deformation and distortion of the synthetic resin filament and also of the helices formed therefrom. This distortion of the helices complicates production of the sieve belt and detracts from its ability to resist pileup during use.

SUMMARY OF THE INVENTION

It is the object of the invention to provide a sieve belt of the initially defined type which has a long service life and does not leave any marks, and a method for producing such a sieve belt.

These objects are attained by the use of helices free of both tension-bias and torsion in the manufacture of the sieve belt and by thermosetting the sieve belt in its extended conditions after the pintle-filament has been inserted through the channel formed by the interlocked helices.

The sieve of the invention is suited particularly for use in the drying section of a papermaking machine. Owing to the fact that the windings of the individual helices lie relaxed in the sieve belt, i.e. without any tension-biasing, there is no friction and wear between the individual windings. The helices of thermosettable synthetic resin filament used for the production of the sieve belt may have a cross section such that after being interlocked, the helices form wide, round cross-sectional channels through which the pintle-filaments can be easily inserted. The flattened cross section of the helix and the waved configuration of the inserted pintle-filament is effected after the insertion of the pintle-filament. The surface of the sieve belt thermoset in this way is very smooth and therefore leaves almost no marks.

DETAILED DESCRIPTION OF THE PREFERRED EMBODIMENT

Figure 1:
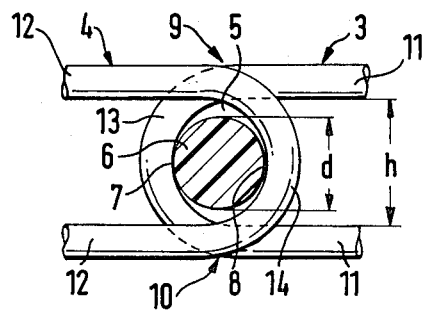
FIG. 1 shows in longitudinal cross section a detail of a prior art sieve belt.

FIG. 1 shows the details of a prior art sieve belt consisting of two helices which were stretched to allow the winding 3 of one helix and the winding 4 of the other helix to be meshed and interlocked. A pintle-filament 6 is inserted through the thus-formed channel 5. Since, prior to interlocking, the helices were thermoset while tightly wound, they are biased into contact with each other perpendicular to the plane of the drawing, which causes friction and wear during operation. The channel 5 formed by the overlapping windings has a height h. To permit easy insertion of the pintle-filament 6 of diameter d, h must be greater than d all the way across the sieve belt. There is point contact between the arcs of the windings 3 and 4 and the inserted pintle-filament 6 which may also cause abrasion. Moreover, a groove is formed in the surface of the sieve belt at 9 and 10 which leaves a mark in the paper. Since the height h of the channel 5 is greater than the diameter d of the inserted pintle-filament 6, individual windings may be offset perpendicular to the plane of the sieve belt. Therefore, special measures must be taken in the preparation of the prior art sieve belt to make certain that winding leg 11 of one winding lies in the same plane as winding leg 12 of an adjacent winding. If they do not lie in the same plane, additional marks will be left in the paper.

Figure 3:
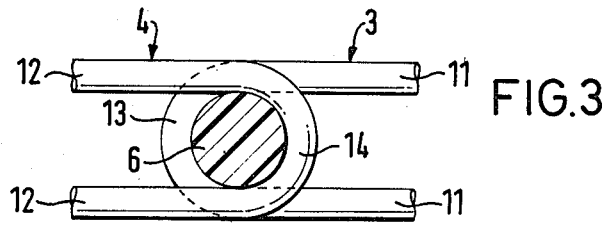
FIG. 3 illustrates the sieve belt of FIG. 2 after thermosetting.

FIG. 3 shows a cross section of a portion of the sieve belt (FIG. 4) of the invention, seen in the longitudinal direction of the inserted pintle-filament and perpendicular to the sieve belt. The winding arcs 13, 14 contact the inserted pintle-filament 6 at an angle of about 180° to each other. The inner radius of the winding arcs 13, 14 thus substantially corresponds to the radius of the inserted pintle-filament 6. The loads occurring at points 7, 8 of the prior art sieve belt (shown in FIG. 1) are therefore distributed evenly in the sieve belt of the invention, greatly reducing the wear of the belt. The semicircular winding arcs 13, 14 merge into straight winding legs 11, 12. Seen in the longitudinal direction of the pintle-filament 6, i.e. as shown in FIG. 3, the winding legs 11 and 12 merge rectilinearly into each other to avoid the grooves formed at 9 and 10 in the prior art sieve belt. The winding legs 11 and 12 are disposed in the same plane, thus preventing the marks caused by the offsetting of the individual helices perpendicular to the sieve plane. At the same time, the open spaces in the sieve belt of the invention are uniform to ensure uniform permeability of the overall sieve.

Figure 10:
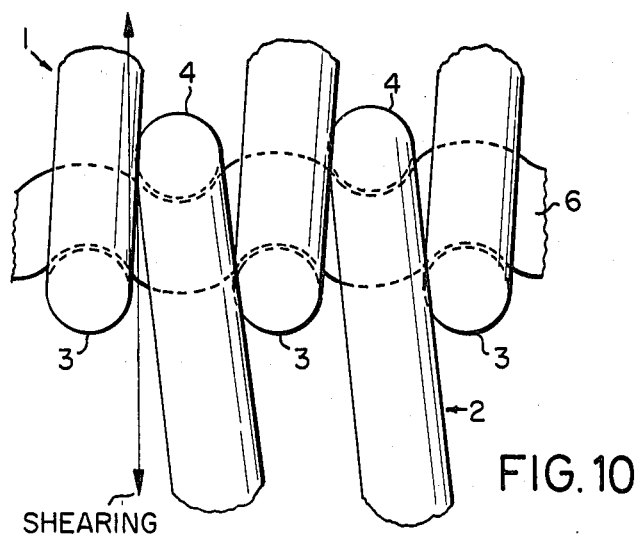
FIGS. 10 and 11 show in comparison the manner in which the inserted pintle-filament is prevented from shearing by the enlarged winding arcs of the helices.
Figure 11:
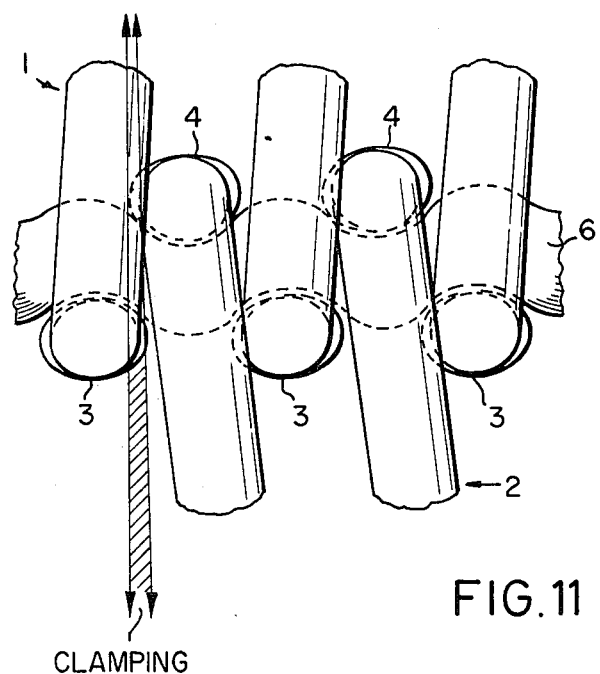

The pintle-filament 6 has a wave-like configuration as viewed in the sieve plane and as shown in FIGS. 10 and 11. The distance between two similarly directed arcs, i.e. the length of one wave, corresponds to the pitch of the helices 1, 2 shown in FIG. 4. This wavy configuration of the pintle-filament 6 prevents lateral shifting of the windings 3, 4.

The helices 1, 2 are not biased or compressed and thus lie relaxed adjacent one another in the sieve belt with no tendency to contract.

Figure 5:
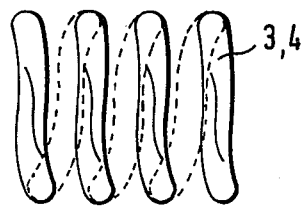
FIG. 5 shows a helix to which torsion has been imparted during production.
Figure 6:
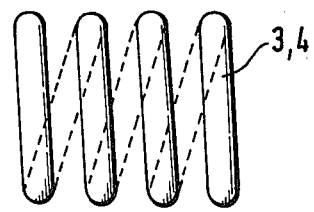
FIG. 6 illustrates a helix produced free of torsion.

The filament forming the helices 1, 2 is also free of torsion. FIGS. 5 and 6 show helices with and without torsion, respectively.

The sieve belt of the invention is produced substantially as follows: each of a multiplicity of helices 1, 2 is interlocked with the preceding helix, i.e. the windings 3 of one helix 1 are inserted between the windings 4 of the next helix 2. The helices are inserted to such an extent that the windings of adjacent helices together form a channel 5. A pintle-filament 6 is inserted into each of said channels. The channel 5 must, of course, be of adequate size, and the inserted pintle-filament 6 is usually straight. After all pintle-filaments 6 are inserted, the sieve belt is subjected to longitudinal tension and thermoset. The windings 3, 4 are deformed by thermosetting to the oval configuration shown in FIG. 3 with semicircular winding arcs 13, 14 and straight winding legs 11, 12, and the winding arcs 13, 14 lying tightly against the inserted pintle-filament 6. The pintle-filament 6, in turn, is caused to assume a wavy configuration as shown in FIGS. 10 and 11.

Since thermosetting does not take place until after the sieve belt is assembled, the helices 1, 2 can initially be of any shape that allows convenient insertion of the pintle-filament 6 into the channel 5 formed by the winding arcs 13, 14. It is only the later thermosetting that imparts the flat, oval cross section to the helices so that the shape of the arc between the winding legs 11, 12 becomes equal to the diameter of the pintle-filament 6. This makes the surface of the sieve belt very smooth so that it will not leave any marks.

Figure 2:
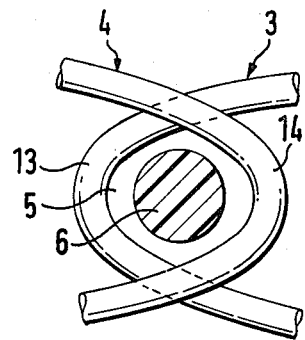
FIG. 2 shows in longitudinal cross section a detail of a sieve belt according to the invention prior to thermosetting.

Consequently, helices having substantially any desired cross-sectional configuration, such as circular or elliptical, may be employed in the manufacture of the sieve belt. The winding arcs 13, 14 illustrated in FIG. 2 are associated with helices having elliptical cross section.

The pitch of the helices is not critical and may vary between one and two times the thickness of the filament. Helices of higher pitch may also be employed. If helices having a pitch less than twice the filament thickness are employed, they must be stretched prior to interlocking until the pitch corresponds to about twice the filament diameter.

In general, therefore, helices are selected that are not tightly wound and whose pitch is greater than the filament diameter; preferably the pitch should be somewhat greater than twice the thickness of the filament. This simplifies interlocking of the helices. The manufacture of such helices will be described further below in conjunction with FIG. 8.

Figure 4:
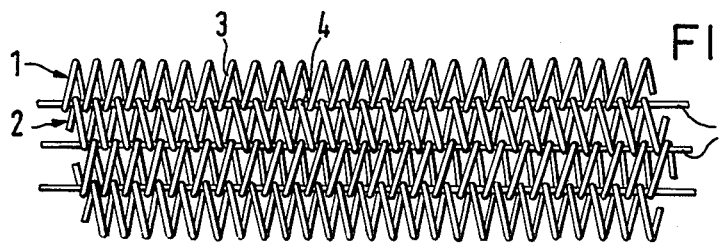
FIG. 4 is a plan view of a section of the sieve belt.

Preferably, adjacent helices 1, 2 are wound in opposite directions, as shown in FIG. 4. The winding arcs 13, 14 will then interlock especially readily, because tangents laid to the winding arcs 13, 14, respectively, have the same spatial alignment. However, it is also possible to alternate a plurality of helices with right hand winding with a plurality of helices with left hand winding. Helices of the same winding direction can also be used exclusively in a sieve belt, although in that case special measures might have to be taken to prevent the sieve from running off the track.

If helices with enlarged winding arcs 13, 14 are employed, the most suitable pitch of the helices depends not only on the thickness of the helix but also on the width of the enlarged winding arcs 13, 14. Preferably the pitch of the helices is then at least twice the filament thickness and is at most equal to the sum of filament thickness and enlarged winding arc width.

Figure 9A:
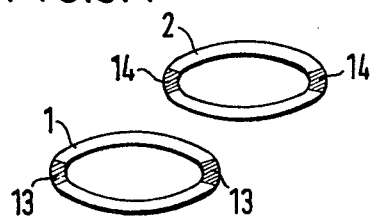
Figure 9B:
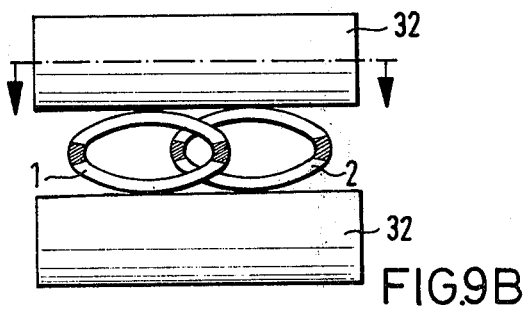

The joining of two helices is relatively simple in view of the precisely adjusted free space between the windings. If helices with enlarged winding arcs 13, 14 are employed, two helices are placed in overlying laterally off-set relationship (see FIG. 9a), the helices are stretched somewhat and then passed together between two compression rolls 32 whereby they are urged into one another (FIG. 9b). After elimination of the tension exerted on the helices, the enlarged winding arcs 13, 14 hold the helices in position so that a straight pintle-filament can be inserted. The subsequent helices are jointed in the same way.

The enlarged winding arcs 13, 14 must be placed between the windings of the adjacent helix as the helices are interlocked. When the space between the windings is somewhat less than the width of the enlarged winding arcs 13, 14, a helix need be stretched only slightly to admit the enlarged arcs between the windings. This is advantageous over tightly wound helices which must be stretched out to more than twice their original length. Such great elongation of the helix results in considerable difficulties because of the required high precision. Relatively minor non-uniformities of the filament material, for example, may result in different elongation in different sections of the helix.

Figure 7:
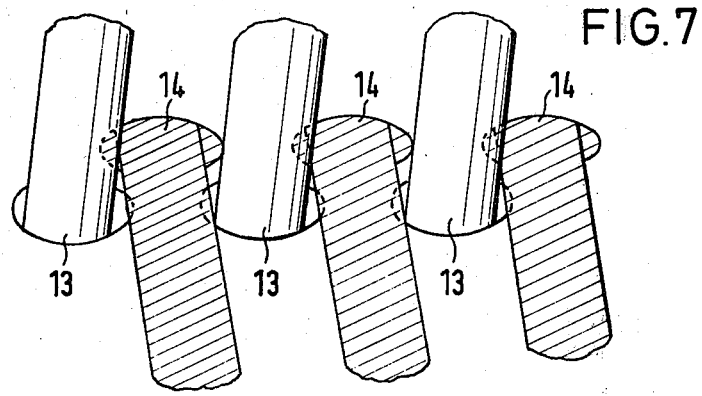
FIG. 7 shows the engagement of the windings of adjacent helices having enlarged winding arcs.

After the enlarged winding arcs 13, 14 of the helix have been inserted into the adjacent helix, the helices are allowed to relax and the windings of interlocked helices come into contact without bias. The enlarged arc portions prevent the helices from separating from each other. Therefore, a straight pintle-filament 6 can be conveniently inserted. This interlocking of the helices is shown in FIG. 7.

After the helices are interlocked and the pintle-filament is inserted, the sieve belt is not yet ready for use. In order to avoid any chance of leaving marks in the paper, the surface of the sieve belt must be smoothed. Moreover, the windings of the helices may still move freely about the pintle-filament. Such movement of the windings may easily occur during handling of the sieve belt, and there is a risk that the helices will remain in the elongated condition due to friction. Furthermore, the interlocked helices may have local areas where the helices are no longer free of tension-biasing. In these areas, external influences may have reduced the pitch of the helix to less than twice the filament thickness. Similar defects may be caused by minor deviations in the thickness of the filament. All these defects would cause wrinkling of the sieve belt, for example during mounting thereof in a papermaking machine, and render it unusable.

The above-mentioned thermosetting of the sieve belt overcomes these difficulties. Thermosetting eliminates any existing bias of the helix, smooths the surface of the sieve belt and causes the individual windings to penetrate somewhat into the material of the pintle-filament, thus giving said pintle-filament a wavy configuration. The individual windings are thereby secured against lateral shifting. Enlarged arcs of the helix windings not only prevent the helices from coming apart before insertion of the pintle-filament but also reduce abrasion between the windings and the pintle-filaments, because the enlarged arc provides a larger area of contact with the pintle-filament than a filament that has not been so deformed. Furthermore, the load on the pintle-filament is more favorable when the winding arcs 13, 14 are enlarged, because the enlarged arc increases the area of contact between the inserted pintle-filament and helix filament. When the filament is not deformed, i.e. when it does not have enlarged winding arcs, the pintle-filament is subjected to shearing forces (FIG. 10) against which synthetic filamentary material offers only moderate resistance because of its macromolecular longitudinal orientation. The enlarged winding arcs, which overlap each other as seen in the longitudinal direction of the sieve belt, clamp a portion of the pintle-filament between them so that any shearing force is greatly reduced (FIG. 11).

If a completely smooth surface is not obtained with the tension and heat applied during thermosetting, pressure may also be applied perpendicularly to the problem area of the sieve belt, e.g. by heated plates. The deformation of the initially round or elliptical helix into an oval is then no longer exclusively dependent on the amount of exerted tension.

Because the sieve belt is not subjected to thermosetting until it is assembled, the temperature, tension and any compressive forces applied by the heater plates may be selected such that not only the windings 3, 4 are pressed into the shape of a flat oval but that the windings 3, 4 also penetrate somewhat into the material of the pintle-filament 6. This locks the windings 1, 2 in position and prevents them from being displaced along the pintle-filaments 6, which might occur, for example, as the sieve belt is pulled into place in a papermaking machine, causing waves in the sieve belt. Furthermore, this prevents interstices between the helices.

In order to ensure adequate and uniform heat throughout the thickness of the sieve belt and over the entire surface thereof, the heat should preferably be supplied by a heated stream of air.

Figure 8:
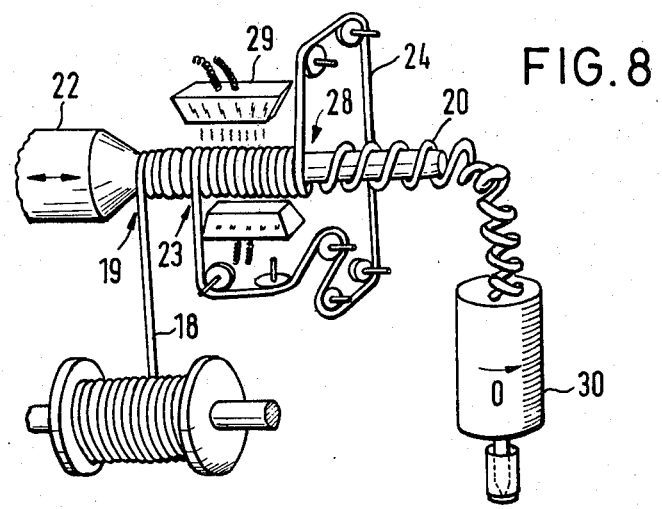
FIG. 8 is a schematic illustration of an apparatus for producing helices without subjecting the filament to torsion, FIGS. 9A and 9B schematically illustrate the mode of interlocking the helices.

FIG. 8 shows an apparatus for producing torsionless synthetic resin helices. The apparatus comprises a rotating mandrel 20 and a cone 22 guided in a reciprocating manner at one end of the mandrel 20. The helix is produced by feeding a first filament 18 to the rapidly rotating mandrel 20 at 19. The first filament 18 is thus wound onto the mandrel 20 by means of the cone 22, which reciprocates rapidly, and the thus-formed helix is pushed across the mandrel 20 to the right hand side in FIG. 8. After a small number of windings have been formed, a second filament 24 of heat-resistant material moves onto the mandrel 20 at 23 and enters between the windings of said first filament 18. The windings of the first filament 18 are thereby urged apart, thus enabling the space between the windings of said first filament to be precisely determined by the thickness of the second filament 24. It is also possible to feed both filaments onto the mandrel 20 at substantially the same location. If this is done the filaments should form an angle of 90° between them in order to prevent the cone 22 from urging one filament over the other.

The second filament 24 accompanies the first filament 18 along a given number of windings, namely through a thermosetting zone in which the helix formed of the first filament 18 is set in spread-apart condition by a heating means 29. After having passed through said thermosetting zone, the second filament 24 leaves the mandrel 20 at 28 and is then either rewound on a reel or returned to the point 19 along a closed path provided with tensioning and braking means. The helix formed from the first filament 18 has then been set in the desired configuration. It leaves the tapering mandrel 20 and drops into a collecting bin 30. Since the helix rotates about its axis, it is necessary for the collecting bin 30 to synchronously follow this rotary motion because otherwise the helix would become entangled in an inextricable mass.

In this way the first filament 18 can be shaped into a helix whose pitch can be adjusted precisely to a value between twice the filament thickness and the sum of filament thickness and enlarged winding arc width and which is free of torsion.

For the production of a helix with enlarged winding arcs 13, 14 the filament material is wound around a mandrel 20 of oval cross section. Owing to the oval cross section the filament tension periodically increases and decreases during wind-up such that the tension rises abruptly each time the first filament 18 passes over the round sections of the oval mandrel 20. The filament is selected such that the abrupt rise in tension effects a deformation of the filament material. The first filament 18 flattens somewhat at this point, i.e. its dimension parallel to the axis of the mandrel 20 becomes wider. The helix filament material is thus flattened at the outer ends or winding arcs 13, 14 of the oval (see FIG. 7).

If the helices were produced in the conventional manner, torsion would be imparted to the filament of the windings 3, 4 so that, when seen in plan view, the legs of the windings would form an elongate S as shown in FIG. 5. The point of deformation cannot be predetermined and adjacent windings are therefore generally further apart than would be expected from the thickness of the filament.

On the other hand, FIG. 6 shows a helix produced free of torsion, i.e. a helix to whose filament no torsion was imparted during its manufacture. A torsionless helix may be smoothly joined to another torsionless helix. Since there is no distortion or deformation of windings, the helices, after interlocking, do not have a length greater than that corresponding to the filament diameter and the number of windings.

Helices produced with torsion cannot be freed from torsion by later thermosetting because the required high temperatures would deteriorate the properties of the synthetic resin material.

EXAMPLE

Helices of oval cross section are produced from polyester monofilamentary material of 0.7 mm thickness, the maximum and minimum diameters of the oval being 6.8 mm and 3.8 mm, respectively. The width of the heads is 0.93 mm and the pitch is 1.54 mm. For the pintle-filament, polyester filament of 0.9 mm thickness was used. The thickness of the sieve belt prior to thermosetting was 3.8 mm and there were 23 pintle-filaments per 10 cm sieve belt length. The number of helical windings was 65 per 10 cm sieve belt width. After thermosetting the thickness of the sieve belt was 2.5 mm and the number of pintle-filaments was 20.3 per 10 cm sieve belt length and the number of windings was 65 per 10 cm sieve belt width. The sieve belt had a weight of 1.450 kg/m$^2$ and an air permeability of 950 cfm. The maximum and minimum dimensions of the oval cross section of the helices were 7.2 mm and 2.5 mm, respectively, after thermosetting.

What is claimed is:

1. A sieve belt of the type used in a paper making machine and comprising a plurality of interleaved helices of windings of thermosettable synthetic resin, the helices being longitudinally unbiased and the windings being free of torsion, and a plurality of pintle-filaments extending through respective channels formed by the interleaved windings of adjacent helices, the individual windings of the helices protruding into the material of the pintle-filaments so that the helices and pintle-filaments are interlocked to hold together the helices and prevent lateral shifting thereof.

2. Sieve belt according to claim 1, wherein said pintle-filament has a wavy configuration and the length of one wave substantially corresponds to the pitch of said helices.

3. Sieve belt according to claims 1 or 2, wherein said pintle-filament is circular and there is only one thereof per channel, the windings of said helices are oval and the elements thereof at the surface of the belt are parallel to each other to form a smooth belt surface, and the winding arcs are substantially semicircular and form said channel having a circular cross-section which engages the entire periphery of the pintle-filament passing therethrough.

4. Sieve belt according to claim 3, wherein the winding arcs of the helices have enlarged portions extending in the longitudinal direction of said helices.

5. Sieve belt according to claim 4, wherein the pitch of said helices is between twice the winding thickness and the sum of said winding thickness and the width of said enlarged winding arcs.

* * * * *